(12) United States Patent
Hornung

(10) Patent No.: US 12,010,941 B2
(45) Date of Patent: Jun. 18, 2024

(54) SEED METERING DEVICE

(71) Applicant: Matthew Hornung, Dodge City, KS (US)

(72) Inventor: Matthew Hornung, Dodge City, KS (US)

( * ) Notice: Subject to any disclaimer, the term of this patent is extended or adjusted under 35 U.S.C. 154(b) by 391 days.

(21) Appl. No.: 17/012,069

(22) Filed: Sep. 4, 2020

(65) Prior Publication Data
US 2022/0071084 A1 Mar. 10, 2022

(51) Int. Cl.
*A01C 7/12* (2006.01)

(52) U.S. Cl.
CPC .................................... *A01C 7/122* (2013.01)

(58) Field of Classification Search
CPC .. A01C 7/122; A01C 7/18; A01C 7/14; A01C 7/125; A01C 7/124; A01C 7/123
See application file for complete search history.

(56) References Cited

U.S. PATENT DOCUMENTS

| | | | | |
|---|---|---|---|---|
| 1,844,172 A * | 2/1932 | Moore | ....................... | F23K 3/00 406/68 |
| 1,882,861 A * | 10/1932 | Moore | ....................... | F23K 3/00 406/68 |
| 1,955,368 A * | 4/1934 | Hoberg | .................. | A01C 7/123 222/266 |
| 1,965,498 A * | 7/1934 | Kletetschka | .............. | F23K 3/00 406/68 |
| 2,424,742 A * | 7/1947 | Coetzee | .................... | A01C 7/12 111/78 |
| 2,535,222 A * | 12/1950 | Milton | ..................... | A01C 7/04 111/164 |
| 2,684,788 A * | 7/1954 | Bland | .................... | E01C 23/166 222/623 |
| 2,740,672 A * | 4/1956 | Morrow | ................. | B65G 53/22 406/138 |
| 2,890,079 A * | 6/1959 | Stumpf | ................... | B05B 7/144 406/67 |
| 3,606,965 A * | 9/1971 | Cortelyou | ................ | A01C 7/06 222/315 |
| 3,954,204 A * | 5/1976 | Becker | ..................... | A01C 7/12 221/266 |

(Continued)

FOREIGN PATENT DOCUMENTS

| | | | | |
|---|---|---|---|---|
| CA | 1126587 A | * | 6/1982 | ............. A01C 7/081 |
| CA | 2737721 A1 | * | 10/2012 | ............. A01C 7/126 |

(Continued)

*Primary Examiner* — Jamie L McGowan
(74) *Attorney, Agent, or Firm* — Gregory M. MacDonald

(57) ABSTRACT

A novel seed metering device which accommodates a large diversity of seed types and sizes by utilizing a rotating two crevice helical pattern in which individual seeds are channeled around two opposing rotors and dispensed singularly or volumetrically based on desired outcome. The two opposing rotors, each with a half set of creviced helical patterns, are adjustable to open and close in order to accommodate seed size and type. When the rotors are adjusted all the way in, the primary crevice is closed and the secondary crevice remains open for the smaller seed sizes to pass through and evenly dispense. As the rotors are adjusted out away from each other, incremental increases can be achieved in order to find the ideal crevice width to accommodate the seed diameter for singular or even disbursement.

14 Claims, 8 Drawing Sheets

(56) References Cited

U.S. PATENT DOCUMENTS

| | | | | |
|---|---|---|---|---|
| 4,023,509 A | * | 5/1977 | Hanson | A01C 7/20 |
| | | | | 111/190 |
| 4,259,912 A | * | 4/1981 | Stocks | A01C 7/08 |
| | | | | 111/178 |
| 4,307,822 A | * | 12/1981 | Hardesty | A01C 7/16 |
| | | | | 222/352 |
| 4,379,664 A | * | 4/1983 | Klein | A01C 7/081 |
| | | | | 222/311 |
| 4,705,220 A | * | 11/1987 | Gandrud | A01C 7/123 |
| | | | | 239/654 |
| 5,549,060 A | | 8/1996 | Schick | |
| 7,083,069 B2 | * | 8/2006 | Wysong | A01C 7/127 |
| | | | | 222/274 |
| 7,765,943 B2 | | 8/2010 | Landphair | |
| 8,516,969 B2 | | 8/2013 | Wendte | |
| D816,726 S | * | 5/2018 | Cloutier Boily | D15/28 |
| 10,798,871 B2 | * | 10/2020 | Gilstring | A01C 7/081 |
| 10,973,164 B2 | * | 4/2021 | Finlayson | A01C 7/123 |
| 2002/0088383 A1 | * | 7/2002 | Barry | A01C 7/04 |
| | | | | 111/181 |
| 2019/0387665 A1 | * | 12/2019 | Finlayson | A01C 7/123 |
| 2021/0168993 A1 | * | 6/2021 | Finlayson | A01C 7/12 |

FOREIGN PATENT DOCUMENTS

| | | | | | |
|---|---|---|---|---|---|
| CA | 3013894 A1 | * | 8/2017 | | A01C 7/081 |
| DE | 2310979 A1 | * | 9/1974 | | |

* cited by examiner

SEED METERING DEVICE

CROSS-REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. Field of the Invention

The present invention generally relates to agricultural machinery. More specifically, the present invention relates to a seed metering device.

2. Description of Related Art

In the prior art, a vacuum planter uses a vacuum to singulate seeds for planting. Seed singulation refers to the way a meter takes one seed at a time off of a disc and drops it down into a seed tube. A vacuum planter typically comprises a vertical plate with holes specific to the type of seed singulated. One problem with a vacuum planter is that the vertical plate is seed specific, which requires the plates to be changed each time a different type of seed is used. Another problem with a vacuum planter is that there is a considerable amount of mechanisms and power used by the vacuum to singulate. In addition, another problem with a vacuum planter is that it requires a substantial size and footprint. This large size creates problems when narrow rows of seed need to be planted. Furthermore, another problem with a vacuum planter is that it is difficult to plant a large volume of seeds at a price that is cost effective.

Therefore, for the foregoing reasons, there is a need for a device that singulates seeds for planting that can (1) handle various types of seed, (2) can adjust between seed sizes without the need to remove seed-specific plates, (3) has a minimal amount of parts, (4) requires, minimal power, (5) only requires a small footprint, (6) allows for planting narrow rows of seed, and (7) is cost effective. The device described in this patent application fulfills at least one of these needs or creates other utility.

BRIEF SUMMARY OF THE INVENTION

It is a principal object to solve at least one of the disadvantages with other attempted solutions or to create other utility by providing a device that singulates seeds for planting that can (1) handle various types of seed, (2) can adjust between seed sizes without the need to remove seed-specific plates, (3) has a minimal amount of parts, (4) requires, minimal power, (5) only requires a small footprint, (6) allows for planting narrow rows of seed, and (7) is cost effective.

The device described in this patent application is a seed metering device that fulfills at least one of these needs or creates other utility. The seed metering device accommodates a large diversity of seed types and sizes by utilizing a rotating two crevice helical pattern in which individual seeds are channeled around two opposing rotors and dispensed singularly or volumetrically based on desired outcome. Two opposing rotors, each with a half set of creviced helical patterns, are adjustable to open and close in order to accommodate any seed size and type. When the rotors are adjusted all the way in, the primary crevice is closed and the secondary crevice remains open for the smaller seed sizes to pass through and evenly dispense. As the rotors are adjusted out away from each other, incremental increases can be achieved in order to find the ideal crevice width to accommodate the seed diameter for singular or even disbursement.

The device comprises a two crevice helical pattern that allows for seeds to evenly fall into the slot opening as the meter rotates. The helical curvature allows the seed to evenly discharge (aka singulate) out of the slot as it rotates past the discharge position. These two actions effectively singulate and drop individual seeds down the delivery tube. Smaller sized seeds use the first slot when rotors are all the way closed, where they are touching. Larger sized seeds or any other specific seed size can be singulated by opening opposing rotors.

In addition, the invention comprises two opposing rotors that are adjustable to open and close in order to accommodate various seed sizes and type.

Furthermore, the invention comprises two opposing rotors. Only one rotor rotates, which is held in place from lateral movements by a dowel pin. The hex shaft can still slide through this rotor. The other rotor is locked to the hex shaft with set screws, which allows it to open when the hex shaft is moved laterally. Both of the "opposing rotors" contain a crevice. Multiple seeds will fill the trough and will fall into crevice and singulate as the shaft rotates.

This new meter mechanically singulates many different seeds by simply moving the hex shaft laterally and moving one of the rotors open. It is infinitely adjustable between closed to about one (1) inch open to create the correct crevice size per seed type being metered. This allows one to volumetrically seed (i.e. grain drill) or get a more singulated effect (i.e. vacuum planter). It allows the farmer to own one piece to seeding equipment and not two in many cases. It allows for narrow spacing as it does not take up much room. It has very much less mechanism and power functions required, etc.

BRIEF DESCRIPTION OF THE DRAWINGS

The accompanying drawings, which are incorporated in and constitute a part of this specification, illustrate several aspects described below.

DETAILED DESCRIPTION OF THE INVENTION

Figure 1:
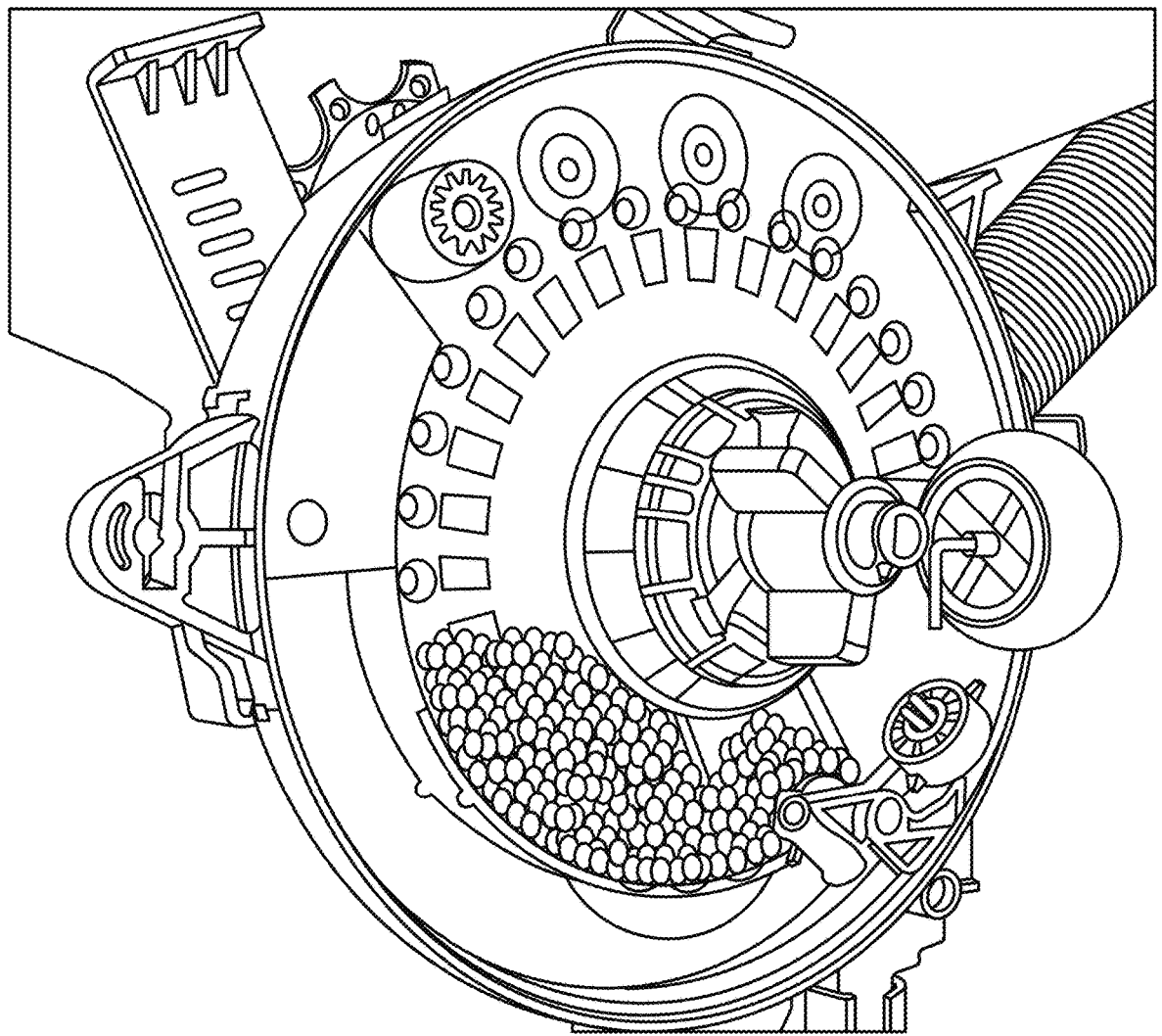
FIG. 1 is a side view of the prior art showing a vacuum planter with seed singulation.

It is to be understood that this invention is not limited to any particular embodiment described, which may vary. Also, it is to be understood that the terminology used herein is for the purpose of describing particular embodiments only, and is not intended to be limiting, since the scope of this invention will be limited only by the appended claims.

In the following detailed description, numerous specific details are set forth in order to explain and provide a thorough understanding of the present invention. However, it is apparent that the present invention may be practiced without all of these specific details. Thus, all illustrations of the drawings are for the purpose of describing versions of the present invention, and are not intended to limit the scope of the invention.

In the following section, the present invention is described fully by referencing the details in the enclosed drawings, which illustrate certain embodiments of the invention. The numbers shown in this specification refer to the corresponding numbers in the enclosed drawings. The terminology used is to describe the particular embodiment shown and is not intended to limit the scope of the invention. The invention may also be embodied in many other forms in addition to the embodiments shown. Thus, the embodiments shown should not be construed as limiting, but rather, to allow a thorough and complete description of the disclosure that conveys the scope of the invention to a person having ordinary skill in the art in the field of this invention. Therefore, for the terms used herein, the singular forms "the," "a," and "an" are intended to include the plural forms as well as the singular forms, unless the context clearly indicates otherwise. The term "and" includes any and all combinations of one or more of the associated listed items. As used herein, the terms "comprising" and "comprises" when used in this specification, identify specific steps, integers, operations, features, components, and elements, but do not preclude the presence or addition of one or more other steps, operations, features, components, and elements. In addition, the features, components, and elements referenced may be exaggerated for clarity.

Unless otherwise defined, all scientific terms, technical terms, or other terms used herein have the same meaning as the term that is understood by one having ordinary skill in the art in the field of this invention. It is also understood that these terms, including their dictionary meaning, should be understood as having the meaning, which is consistent with their definitions in the related relevant art. In addition, the present disclosure is not to be interpreted in an idealized or overly formal sense unless expressly stated so herein. Constructions or functions that are well known in the art may not be fully described in detail for brevity.

In describing the invention, it is understood that a number of steps and methods may be disclosed. Each of these may have individual benefit. Also, each may be used in conjunction with at least one or more of the disclosed steps and methods. Therefore, this description will refrain from stating each and every possible combination of the individual steps and methods for the sake of brevity. Regardless, the specification and related claims should be understood with the combinations that are entirely within the scope of the claims and inventions.

The disclosure in this invention are examples of how it may be implemented and are not intended to limit the scope of the invention to the specific embodiments shown in the accompanying drawings or the description provided herein. The present invention will now be described by example in the following paragraphs by referencing the accompanying drawings, which represent embodiments and alternative embodiments.

All illustrations are for the purpose of describing selected versions of the present invention and are not intended to limit the scope of the present invention.

FIG. 1 is a side view of the prior art showing a vacuum planter with seed singulation. Seed singulation refers to the way the meter takes one seed at a time off the disc and drops it down the seed tube. A vacuum planter has a vertical plate with holes specific to the type of seed singulated and carried around by means of a vacuum. One disadvantage of using a vacuum planter is that the plate with a vacuum applied is seed specific. This requires plates to be changed each time there is a change in seed type. A vacuum planter also requires a large number of parts, mechanism and power for the vacuum to singulate. In addition, the size and foot print of a vacuum planter creates problems when trying to plant narrow rows. This makes it difficult to plant a large volume of seeds, which makes it not cost effective. This is why a grain drills exists, for cereal grain and larger volumetric seeding.

Figure 2:
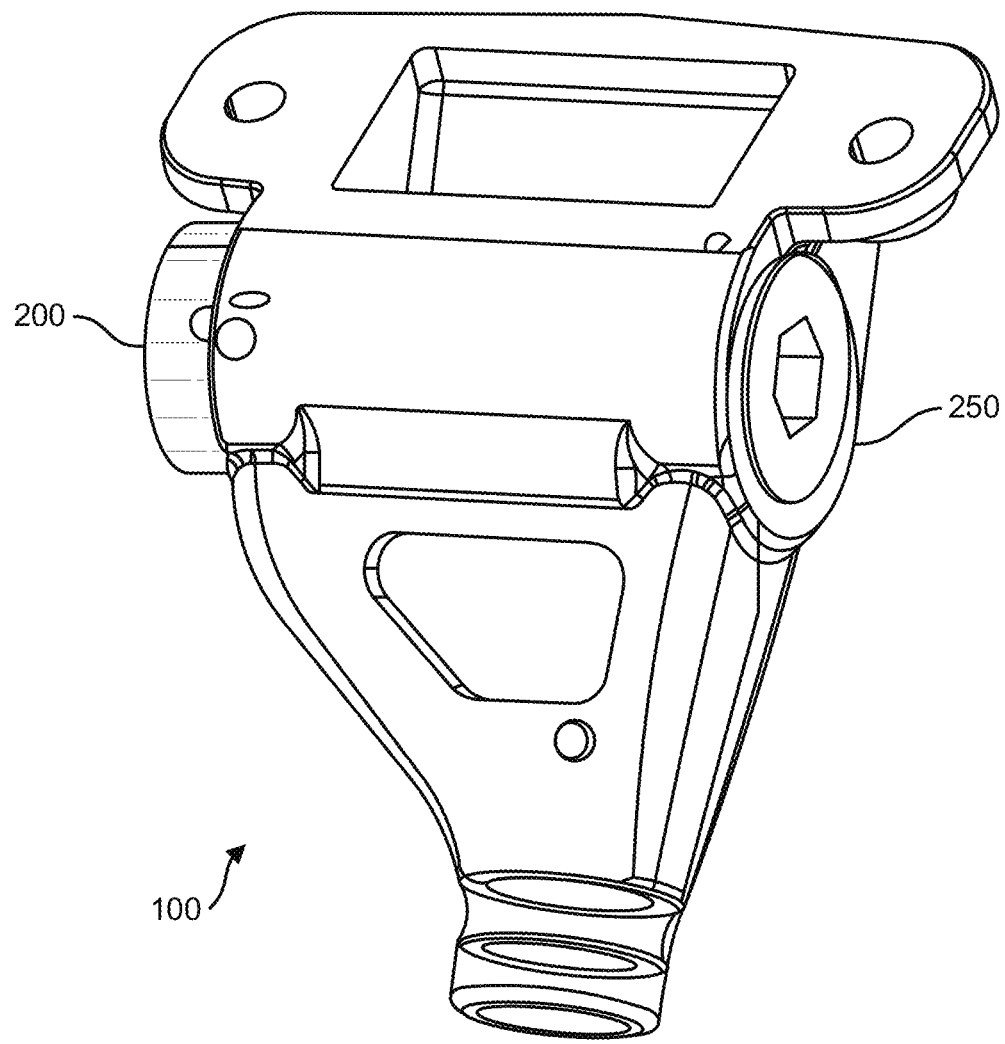
FIG. 2 is a front isometric view of the device of the present invention in which at least one of the embodiments of this invention is implemented.
Figure 3:
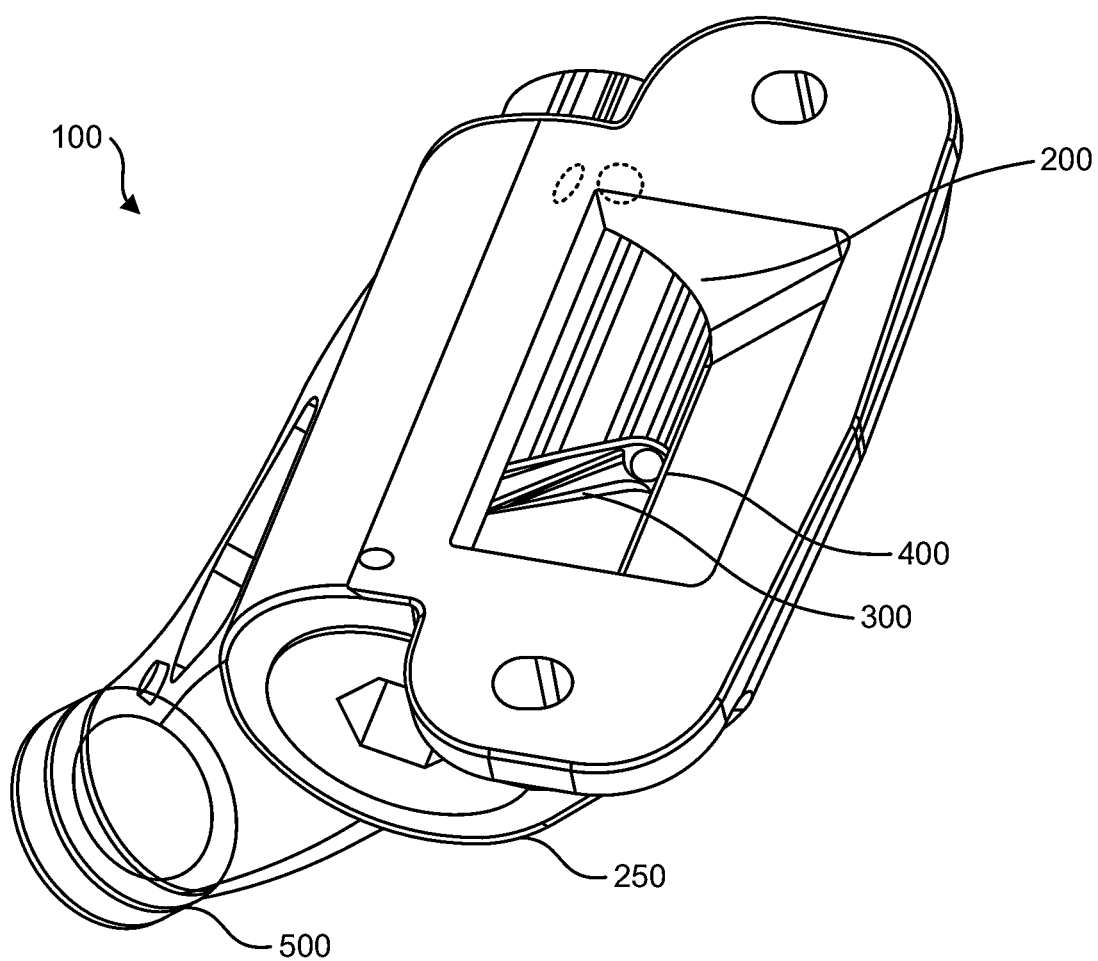
FIG. 3 is a rearward side isometric view of the device of the present invention in which at least one of the embodiments of this invention is implemented.

FIG. 2 is a front view of the novel seed metering device 100 which accommodates a large diversity of seed types and sizes by utilizing a rotating two crevice helical pattern in which individual seeds are channeled around two opposing rotors, the left opposing rotor 200 and the right opposing rotor 250, which dispense singularly or volumetrically based on desired outcome. FIG. 3 shows a top isometric view of the seed metering device 100 with the left opposing rotor 200 and the right opposing rotor 250, the primary crevice 300, the seed 400, and the delivery tube 500. The two opposing rotors 200 and 250, each with a half set of creviced helical patterns, are adjustable to open and close in order to accommodate seed size and type. When the rotors 200 and 250 are adjusted all the way in, the primary crevice 300 is closed and the secondary crevice remains open for the smaller seed sizes to pass through and evenly dispense. As the rotors 200 and 250 are adjusted out away from each other, incremental increases can be achieved in order to find the ideal crevice width to accommodate the seed diameter for singular or even disbursement.

Figure 4:
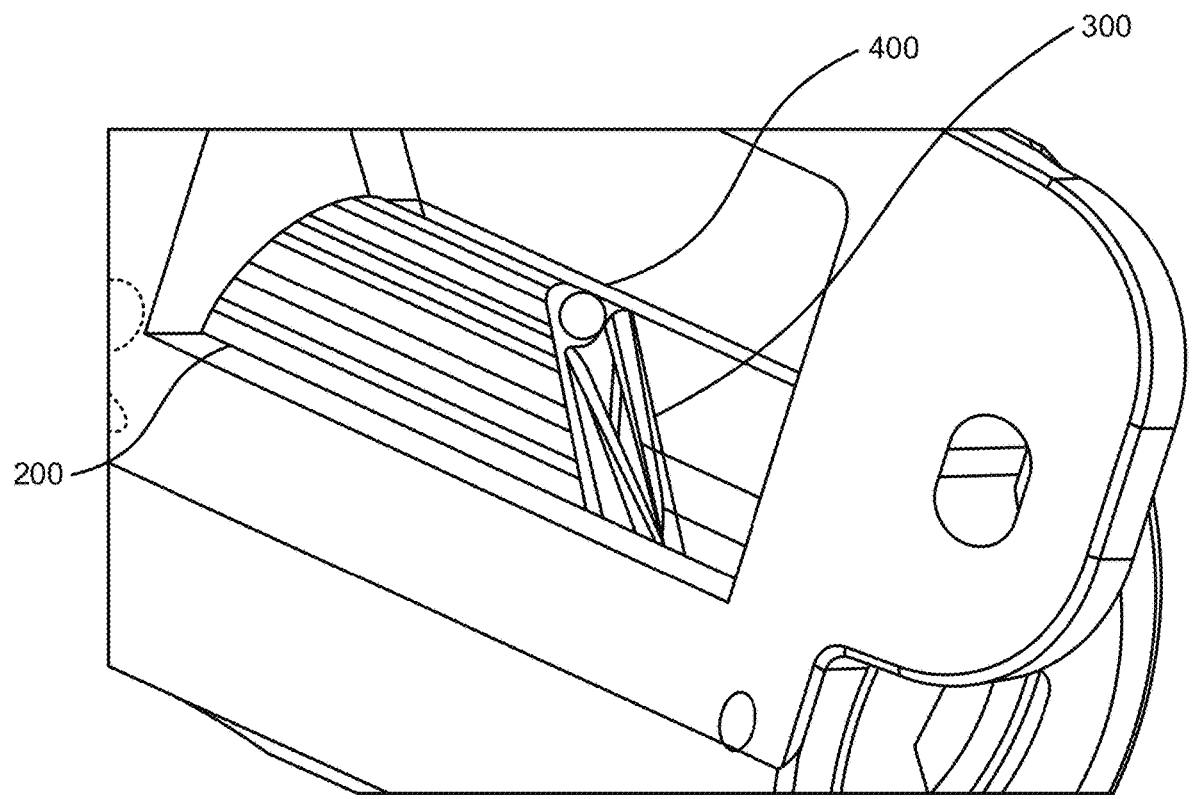
FIG. 4 is a close up isometric view of the device of the present invention in which at least one of the embodiments of this invention is implemented.

FIG. 4 shows a top close-up isometric view of the seed metering device 100 with the left opposing rotor 200 fully closed in relation to right opposing rotor 250, the primary crevice 300, and the seed 400.

Figure 5:
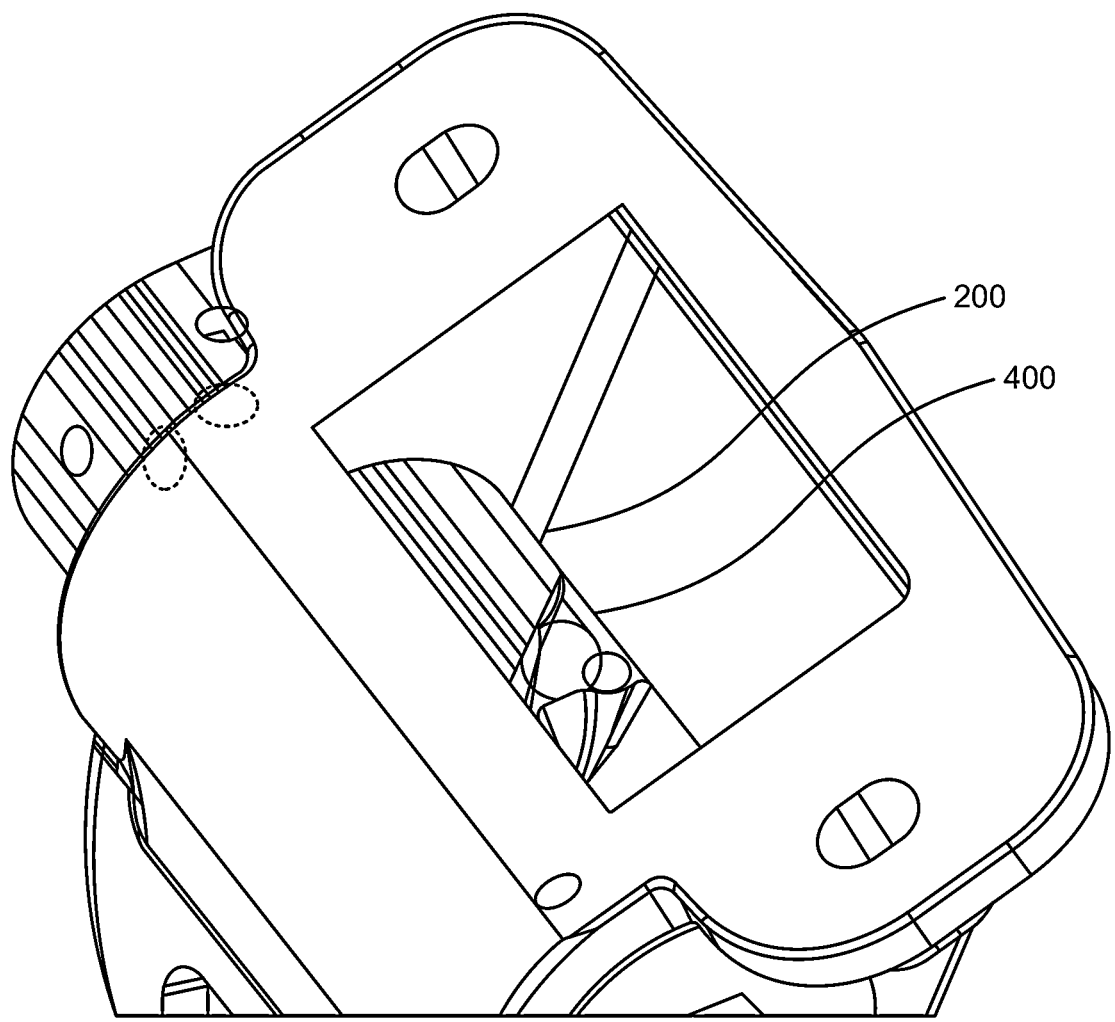
FIG. 5 is a side isometric view of the device of the present invention in which at least one of the embodiments of this invention is implemented.

FIG. 5 also shows a top close-up isometric view of the seed metering device 100 with the left opposing rotor 200, the primary crevice 300, and the seed 400 where in the left opposing rotor 200 is adjusted open in relation to the right opposing rotor 250 in order to accommodate seed 400 of different diameters.

Figure 6:
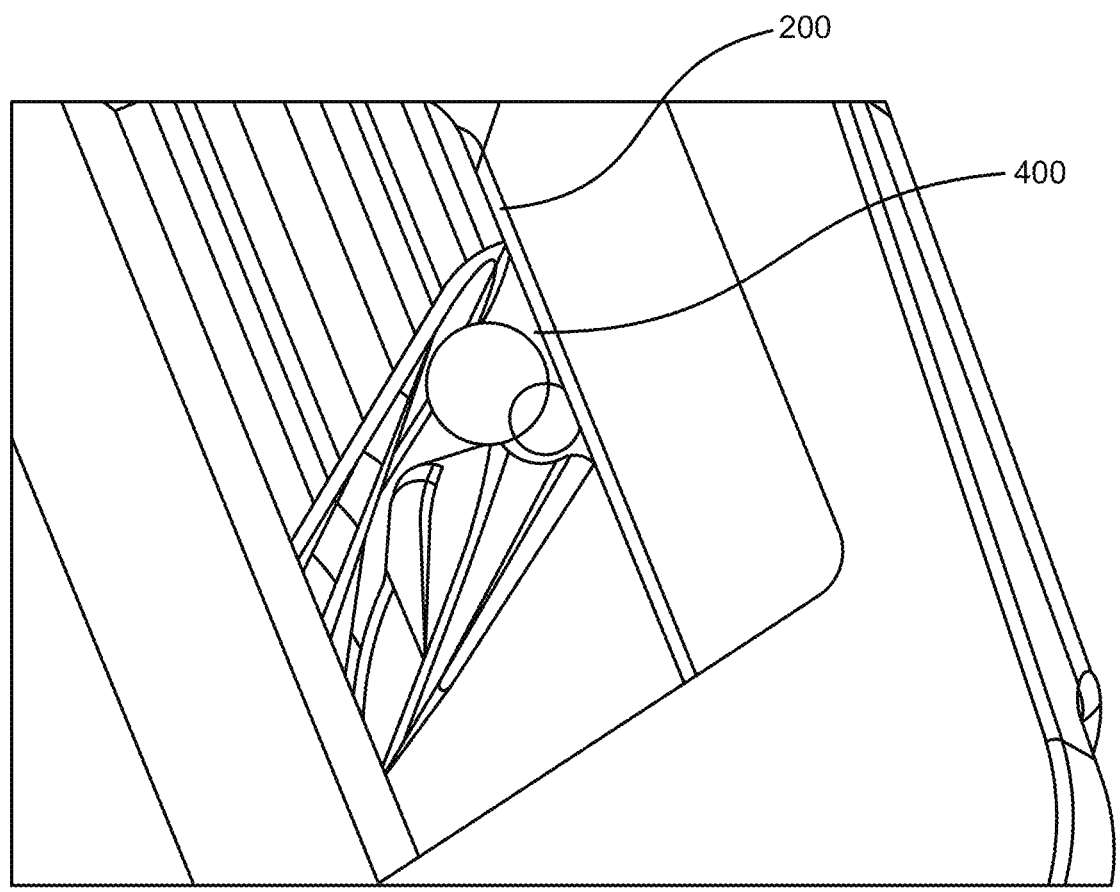
FIG. 6 is a close up isometric view of the device of the present invention in which at least one of the embodiments of this invention is implemented.

In addition, FIG. 6 also shows a top close-up isometric view of the seed metering device 100 with the left opposing rotor 200, the primary crevice 300, and the seed 400 where in the left opposing rotor 200 is adjusted open in relation to the right opposing rotor 250 in order to accommodate seed 400 of different diameters.

Figure 7:
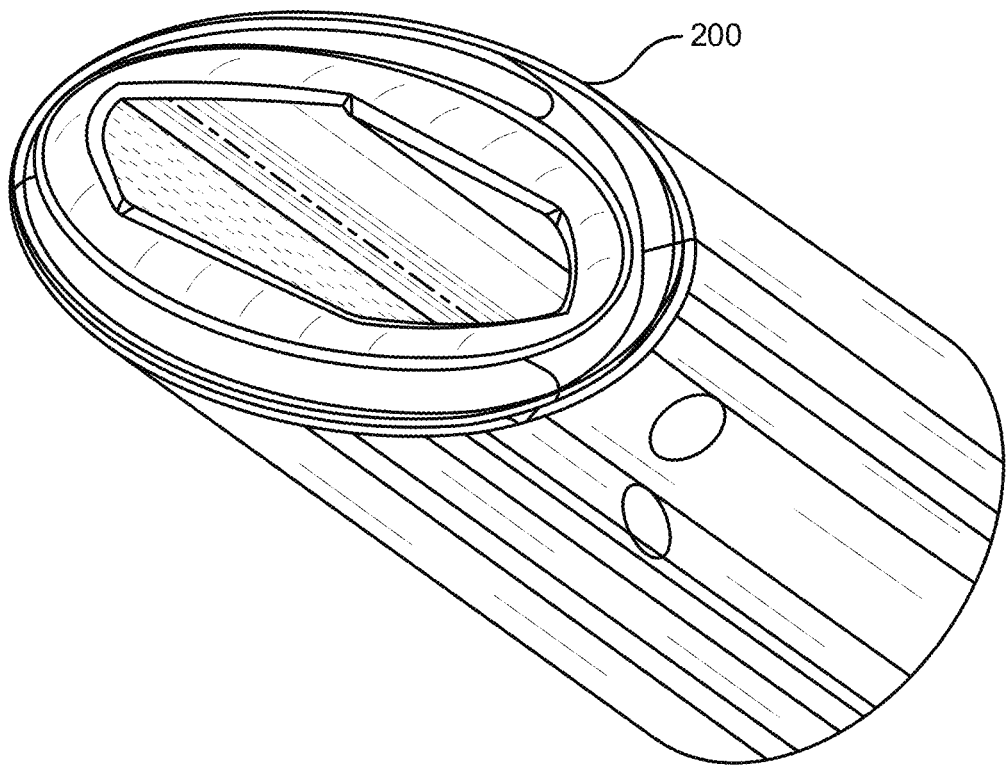
FIG. 7 is an isometric view of a rotor of the present invention in which at least one of the embodiments of this invention is implemented.

FIG. 7 is an isometric view of the left opposing rotor 200 that mates with the right opposing rotor 250 (not shown) and can be opened based on seed size for even seed metering or singulation.

Figure 8:
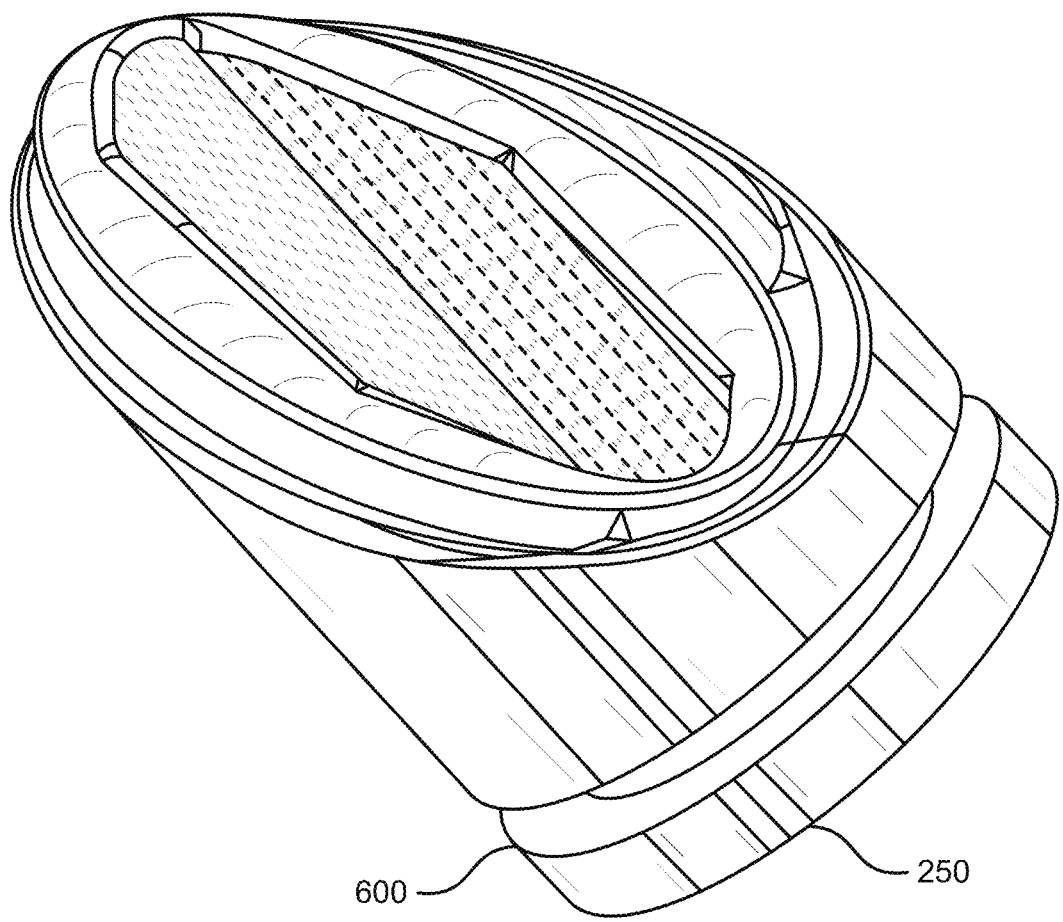
FIG. 8 is an isometric view of a rotor of the present invention in which at least one of the embodiments of this invention is implemented.

FIG. 8 is an isometric view of the right opposing rotor 250 with a slot 600 from which dowel pin rides and allows only rotational movement, not lateral movement.

The device of the present invention comprises a seed metering device, the device comprising a rotational driving member, two opposing rotors, said rotors comprising an outer circumference and an outer circumference. At least one opposing rotor has a half set of creviced and cut patterns. When the cut pattern is proximately mated closed, a creviced slot opening remains, following a trajectorially elliptical pattern around the outer circumference of the rotor, as to proximately create an even width slot width throughout the entire trajectorial circumference.

The device further comprises a laterally fixed rotor, and a laterally adjustable rotor, wherein both the laterally fixed rotor and laterally adjustable rotor are able to rotate by means of a driving member. Also, the laterally adjustable rotor can be incrementally increased or decreased as to accommodate different seed types and sizes.

In at least one embodiment of the present invention, the device may have a rotor diameter between about ½ inch and about 4 inches.

In at least one other embodiment of the present invention, the creviced slot pattern created between the two opposing rotors has a depth between about 1/32 inch and about ½ inch, and a width between about ⅛ inch and about ½ inch.

In at least one other embodiment of the present invention, the seed metering device, comprises a rotational driving member, and two opposing rotors, where at least one opposing rotor has a half set of curved helical creviced and curved helical cut patterns. The cut pattern may be proximately mated closed, so a creviced slot opening remains, following a trajectorially curved helical elliptical pattern around the outer circumference of the rotor, as to proximately create an even width slot width throughout the entire trajectorial circumference.

In yet at least one other embodiment of the present invention, the device may comprise a curved helical pattern creviced and cut pattern for more even dispensing of seed at the drop point.

In at least one other embodiment of the present invention, the device may comprise one laterally fixed rotor and one laterally adjustable rotor, both able to rotate by means of a driving member, where the adjustable rotor can be incrementally increased or decreased as to accommodate different seed types and sizes.

In another embodiment of the present invention, the seed metering device may comprise a rotational driving member, and two opposing rotors, where each opposing rotor has a half set of cut patterns with a cut angle between about 20 and about 60 degrees to a central axis, where the cut pattern is helically curved around cut angle, whereby creating a consistent discharge angle along the moving seed drop location as the opposing rotors rotate.

In at least one other embodiment of the present invention, the device comprises one laterally fixed rotor and one laterally adjustable rotor, both able to rotate by means of a driving member, where the adjustable rotor can be incrementally increased or decreased as to accommodate different seed types and sizes.

In yet at least one other embodiment of the present invention, the device further comprises opposing rotors with different cut angles to the central axis, where a cut pattern elliptical angle is at a different angle than the creviced elliptical angle.

Although the invention has been explained in relation to several different embodiments, it is to be understood that many other possible modifications and variations can be made without departing from the spirit and scope of the invention.

All of these embodiments and the invention disclosed herein are intended to be within the scope herein disclosed. These and other embodiments of the invention will become readily apparent to those skilled in the art from the detailed description of the embodiments having reference to the attached figures, the embodiments not being limited to any particular embodiments disclosed. Also, the invention disclosed herein suitably may be practiced in the absence of any element which is not specifically disclosed herein.

What is claimed is:
1. A seed metering device, the device comprising:
   a. a rotational driving member,
   b. two opposing rotors, said rotors comprising an outer circumference and an inner circumference, wherein the two opposing rotors comprise a fixed rotor and an adjustable rotor, both able to rotate by means of said driving member, wherein the adjustable rotor can be incrementally increased or decreased as to accommodate different seed or material types and sizes,
   c. wherein each opposing rotor has a matching half set of cut patterns that are cut in the same plane through the inner circumference of each rotor to maintain a slot with a width that remains even around the inner circumference of each rotor to control the size of the seed or material that is allowed to pass through,
   d. wherein each opposing rotor has a matching half set of creviced patterns that are cut in the same plane through the outer circumference of each rotor to maintain a crevice with a width that remains even around the outer circumference of each rotor to only allow the smallest seed or material sizes to pass through,
   e. wherein when the adjustable rotor is moved laterally along its central axis to its furthest distance from the fixed rotor a slot with a maximum width is created between the cut patterns following a trajectorially elliptical pattern around the inner circumference of the rotor, as to proximately create an even primary slot width throughout the entire trajectorial circumference for larger seed types, f. wherein when the adjustable rotor is moved laterally along its central axis to its closest distance from the fixed rotor the slot between the cut patterns is at its minimum width and proximately mated closed, only a creviced slot opening remains following a trajectorially elliptical pattern around the outer circumference of the rotor, as to proximately create an even secondary creviced slot width throughout the entire trajectorial circumference for smaller seed types or materials, and g. wherein the rotors may be adjusted to incremental widths between their maximum width and their minimum width in order to achieved ideal slot widths to accommodate the desired seed or material diameter for singular or even disbursement.

2. The device of claim 1, wherein the two opposing rotors comprise:
   a. a dowel pin or similar mechanism that holds the adjustable rotor in place for rotational movement, while preventing lateral movement;
   b. a hex shaft that slides through the adjustable rotor; and
   c. set screws or similar mechanism that lock the hex shaft to the fixed rotor.

3. The device of claim 2, wherein the rotor diameter is between about ½ inch and about 4 inches.

4. The device of claim 3, wherein the creviced slot pattern created between the two opposing rotors has a depth between about 1/32 inch and about ½ inch, and a width between about 1/16 inch and about ½ inch.

5. The device in claim 4, further comprising opposing rotors with different cut angles to the central axis, wherein a cut pattern elliptical angle is at a different angle than the creviced elliptical angle.

6. The device of claim 5, further comprising a curved helical pattern creviced and cut pattern for more even dispensing of seed at a drop point.

7. A seed metering device, the device comprising:
   a. a rotational driving member,
   b. two opposing rotors,
   c. wherein at least one opposing rotor has a half set of curved helical creviced patterns and each opposing rotor has a matching half set of curved helical cut patterns, wherein when the cut patterns are proximately mated closed, a creviced slot opening remains, following a trajectorially curved helical elliptical pattern around the outer circumference of the rotor, as to proximately create an even width slot width throughout the entire trajectorial circumference.

8. The device of claim 7, further comprising a curved helical pattern creviced and cut pattern for more even dispensing of seed at a drop point.

9. The device in claim 8, wherein the two opposing rotors comprise a fixed rotor and an adjustable rotor, both able to rotate by means of said driving member, wherein the adjustable rotor can be incrementally increased or decreased as to accommodate different seed or material types and sizes.

10. The device in claim 9, further comprising opposing rotors with different cut angles to the central axis, wherein a cut pattern elliptical angle is at a different angle than the creviced elliptical angle.

11. The device in claim 7, further comprising opposing rotors with different cut angles to the central axis, wherein a cut pattern elliptical angle is at a different angle than the creviced elliptical angle.

12. A seed metering device, comprising:
   a. a rotational driving member,
   b. two opposing rotors,
   c. wherein each opposing rotor has a half set of cut patterns with a cut angle between about 20 and about 60 degrees to central axis,
   d. wherein the cut pattern is helically curved around cut angle, whereby creating a consistent discharge angle along the moving seed drop location as the opposing rotors rotate.

13. The device in claim 12, wherein the two opposing rotors comprise a fixed rotor and an adjustable rotor, both able to rotate by means of said driving member, whereas the adjustable rotor can be incrementally increased or decreased as to accommodate different seed types and sizes.

14. The device in claim 13, further comprising opposing rotors with different cut angles to the central axis, wherein a cut pattern elliptical angle is at a different angle than the creviced elliptical angle.

* * * * *